US012448812B2

(12) United States Patent
Shiu et al.

(10) Patent No.: US 12,448,812 B2
(45) Date of Patent: Oct. 21, 2025

(54) LOCK HANDLE AND ROTATING SHAFT COMBINATION MECHANISM

(71) Applicant: Taiwan Fu Hsing Industrial Co., Ltd., Kaohsiung (TW)

(72) Inventors: Jiun-Nan Shiu, Kaohsiung (TW); Jun-Kai Ko, Kaohsiung (TW); Ching-Wan Lee, Kaohsiung (TW)

(73) Assignee: Taiwan Fu Hsing Industrial Co., Ltd., Kaohsiung (TW)

( * ) Notice: Subject to any disclaimer, the term of this patent is extended or adjusted under 35 U.S.C. 154(b) by 187 days.

(21) Appl. No.: 18/142,615

(22) Filed: May 3, 2023

(65) Prior Publication Data

US 2024/0044169 A1 Feb. 8, 2024

(30) Foreign Application Priority Data

Aug. 5, 2022 (TW) ................................ 111208515

(51) Int. Cl.
*E05B 3/00* (2006.01)
*E05B 1/00* (2006.01)

(52) U.S. Cl.
CPC ............ *E05B 3/003* (2013.01); *E05B 1/0007* (2013.01)

(58) Field of Classification Search
CPC ... E05B 3/00; E05B 3/003; E05B 3/02; E05B 3/04; E05B 1/0007; E05B 1/06; Y10T 292/85; Y10T 292/865; Y10T 292/869; Y10T 292/084; Y10T 292/0854; Y10T 70/8541; Y10S 292/53; Y10S 292/54; Y10S 70/07
See application file for complete search history.

(56) References Cited

U.S. PATENT DOCUMENTS

| | | | | | |
|---|---|---|---|---|---|
| 191,363 | A * | 5/1877 | Naylor | E05B 3/04 | 292/353 |
| 1,085,543 | A * | 1/1914 | Collins | E05B 3/04 | 24/615 |
| 1,621,174 | A * | 3/1927 | Schlage | E05B 3/003 | 292/348 |

(Continued)

FOREIGN PATENT DOCUMENTS

| | | | |
|---|---|---|---|
| DE | 526348 | C * | 6/1931 |
| GB | 932762 | A * | 7/1963 |

OTHER PUBLICATIONS

Examination Search Report, Canadian Intellectual Property Office, Aug. 29, 2024.

*Primary Examiner* — Carlos Lugo
(74) *Attorney, Agent, or Firm* — Rosenberg, Klein & Lee

(57) ABSTRACT

A lock handle and rotating shaft combination mechanism includes a handle having a tubular socket extending axially. The socket includes a connection portion and a protrusion. A tubular rotating shaft includes a securing member formed radially to the rotating shaft. The securing member is located corresponding to the connection portion. A guiding slot is defined axially in the distal end of the rotating shaft. When the protrusion is engaged with the guiding slot, the rotating shaft expands radially outward, and the securing member is engaged with the connection portion to connect the handle to the rotating shaft. No tool is required during the assembling processes to reduce time for assembling the combination mechanism.

8 Claims, 8 Drawing Sheets

(56) References Cited

U.S. PATENT DOCUMENTS

| | | | | | |
|---|---|---|---|---|---|
| 2,059,319 | A * | 11/1936 | De Vries | E05B 3/04 | 292/352 |
| 2,103,987 | A * | 12/1937 | Kistner | E05B 65/0864 | 70/DIG. 7 |
| 2,111,254 | A * | 3/1938 | Tong | E05B 3/04 | 292/353 |
| 3,177,024 | A | 4/1965 | Krook et al. | | |
| 3,602,539 | A * | 8/1971 | James | E05B 3/04 | 403/345 |
| 4,679,420 | A * | 7/1987 | Yang | E05B 17/0058 | 70/222 |
| 5,297,405 | A * | 3/1994 | Manning | E05B 9/084 | 70/370 |
| 7,140,076 | B2 * | 11/2006 | Hsu | E05B 1/0007 | 292/336.3 |
| 2008/0083092 | A1 * | 4/2008 | Huang | E05B 3/04 | 16/436 |
| 2013/0300136 | A1 * | 11/2013 | Suresha | E05B 1/003 | 292/336.3 |

* cited by examiner

LOCK HANDLE AND ROTATING SHAFT COMBINATION MECHANISM

CROSS REFERENCE TO RELATED APPLICATION

This application claims priority from and takes the benefit of Taiwan Patent Application No. 111208515 filed on Aug. 5, 2022, the contents of which herein incorporated by reference.

BACKGROUND OF THE INVENTION

1. Field of the Invention

The present invention relates to a lock handle and the rotating shaft combination mechanism, and more particularly, to forming a guiding slot in the rotating shaft to easily assemble the rotating shaft to the handle.

2. Descriptions of Related Art

The rotating shaft is mainly used for locks, and is commonly installed in handles to synchronize their rotation with the lock mechanism inside the lock. In order to achieve quick and low-cost production, it is usually made by coiling a sheet material that has been processed beforehand, such as punching, drilling, and milling.

The existing combination between the handle and the rotating shaft usually involves a shaft tube on one end of the handle, and a through-hole defined through the rotating shaft. The rotating shaft is inserted into the shaft tube. The shaft tube is then stamped and riveted onto the through-hole. The positioning process requires additional equipment for stamping and riveting, leading to increased costs. Moreover, the assembly process involves first assembling the outer and inner plates of the lock to form a plate unit, followed by riveting the handle and rotating shaft, and then finally assembling the rotating shaft to the plate unit and performing a second riveting process. This complex assembly process requires multiple production lines and increases manufacturing costs, making it unfavorable for mass production.

In addition, lock manufacturers often perform surface treatments onto the outer plates and handles to produce different colors and glosses based on customer demands. However, once the plate unit and the handles are assembled and positioned, it is impossible to separate them for surface treatment and changing colors or gloss. Therefore, during inventory management, the inner plates, the outer plates, the rotating shafts, and the handles are stored separately until the color and gloss of the confirmed orders are determined. Then the final surface treatments are processed according to the confirmed orders. This increases the processing time for orders and reduces production efficiency, thereby lowering production capacity.

In view of these problems, the present invention has conducted research and improvements on the assembly of the rotating shaft, to provide a better solution to the aforementioned and eliminate shortcomings mentioned above.

SUMMARY OF THE INVENTION

The present invention relates to a lock handle and rotating shaft combination mechanism, and which comprises a handle having a socket extending axially therefrom. The socket is a tubular socket and comprises a connection portion and a protrusion. A rotating shaft is a tubular shaft and comprises a securing member formed radially to the rotating shaft. The securing member is located corresponding to the connection portion. A guiding slot is defined axially in the distal end of the rotating shaft. When the protrusion is engaged with the guiding slot, the rotating shaft expands radially outward, and the securing member is engaged with the connection portion to connect the handle to the rotating shaft.

Preferably, the guiding slot includes a first slot and a second slot communicating with each other. The second slot is located at the distal end of the rotating shaft. When the handle is not assembled to the rotating shaft, the width of the first slot is smaller than the outer contour of the protrusion. The width of the second slot is larger than that of the first slot. An inclined face is formed between the first slot and the second slot.

Preferably, the protrusion includes two guiding faces respectively formed to the rotation direction of the protrusion. The two guiding faces are located corresponding to the inclined faces. When the guiding faces abut against the inclined faces, the rotating shaft expands radially outward.

Preferably, the protrusion is a rectangular shape.

Preferably, the rotating shaft is formed into a tubular shape by rolling a flat body. At least one end face is formed to one of two ends of the flat body in the rolling direction of the flat body to form the guiding slot.

Preferably, a fitting member protrudes from the end of the flat body in the rolling direction of the flat body. A recess is formed to another one of the two ends of the flat body in the rolling direction of the flat body. The depth of the recess is greater than the length of the fitting member.

Preferably, the fitting member is widened in the rotation direction of the flat body. The recess is narrowed in the rotation direction of the flat body.

Preferably, the fitting member and the recess are dovetail shaped.

The present invention further provides a rotating shaft for a lock handle and comprises a flat body which is an elongate plate and includes two ends. The flat body is rolled and formed into a rotating shaft which is a tubular shaft. The flat body has a securing member protruding radially therefrom. At least one end face is formed to one of the two ends of the flat body in the rolling direction of the flat body to form a guiding slot of the rotating shaft. When the guiding slot is axially abutted, the rotating shaft expands radially outward.

Preferably, a fitting member protrudes from one of the two ends of the flat body in the rolling direction of the flat body. A recess is formed to another one of the two ends of the flat body in the rolling direction of the flat body. The depth of the recess is greater than the length of the fitting member.

Preferably, the fitting member is widened in the rotation direction of the flat body. The recess is narrowed in the rotation direction of the flat body.

Preferably, the fitting member and the recess are dovetail-shaped.

Preferably, the guiding slot includes a first slot and a second slot communicating with each other. The second slot is located at the distal end of the rotating shaft. The width of the second slot is larger than that of the first slot. An inclined face is formed between the first slot and the second slot.

The advantages are that the invention uses the guide slot which is an inclined slot defined in the rotating shaft, so that when the rotating shaft is axially connected to the handle, the protrusion is guided to allow the rotating shaft to expand radially outward. The securing member of the rotating shaft is engaged with the connection portion to connect the rotating shaft to be the handle without any tool, thereby greatly reducing the assembly process and improving overall manufacturing efficiency. In addition, the rotating shaft can be easily assembled with the handle by the present invention. Therefore, by pre-assembling the rotating shaft and the inner plate of the lock, and after confirming the color and the form of the selected handle and outer plate of the lock, the rotating shaft, the inner plate, the handle, and outer plate can be quickly assembled without any tools in a modular manner. The process and time of order processing are significantly improved, and the efficiency of production after orders are received is also increased.

This present invention uses a flat body that includes the fitting member and the recess, wherein the depth of the recess is greater than the protruding length of the fitting member. This allows that when the flat body is rolled to be the rotating shaft, the fitting member is located within the recess to a preliminary coupling, however, the fitting member has not yet formed a locking positioning state with the recess. After the protrusion is inserted into the guiding slot, the rotating shaft expands radially outward to engage the fitting member with the recess to prevent the rotating shaft from overly rotating to maintain the effectiveness of transmission between the rotating shaft and the handle.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
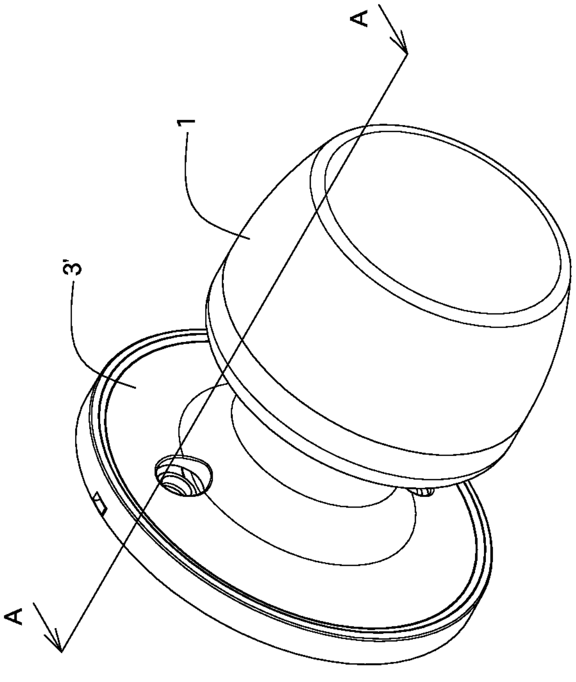
FIG. 1 is a perspective view to show the lock handle and rotating shaft of the present invention.

Referring to FIGS. 1 to 7, the lock handle and rotating shaft combination mechanism of the present invention comprises a handle 1 having a socket 11 extending axially therefrom. The socket 11 is a tubular socket and comprises a connection portion 111 and a protrusion 112. The handle 1 can be a round or rectangular handle, and has a lock core, a knob and a locking mechanism installed therein. The handle 1 can be installed in a room and does not need a locking mechanism. The type of the handle 1 can be optionally chosen according needs. This embodiment of the present invention is a round handle without locking mechanism.

A rotating shaft 2 is a tubular shaft and includes a securing member 21 formed radially to the rotating shaft 2, and the securing member 21 is located corresponding to the connection portion 111. The connection between the securing member 21 and the connection portion can be reversely arranged. A guiding slot 22 is defined axially in the distal end of the rotating shaft 2. The width of guiding slot 22 is gradually narrower toward the inner plate 3. When the protrusion 112 is engaged with the guiding slot 22, the rotating shaft 2 expands radially outward, and the securing member 21 is engaged with the connection portion 11) to connect the handle 1 to the rotating shaft 2.

In order to ensure that when the securing member 21 is engaged with the connection portion 111, the rotating shaft 2 expands radially outward. The rotating shaft 2 is formed into a tubular shape by rolling a flat body 2'. At least one end face 23 is formed to each one of two ends of the flat body 2' in a rolling direction of the flat body 2' to form the guiding slot 22. The at least one end faces 23 each include multiple sections which will be described later.

The guiding slot 22 includes a first slot 221 and a second slot 222 communicating with each other. The second slot 222 is located at the distal end of the rotating shaft 2. When the handle 1 is not assembled on the rotating shaft 2, the width of the first slot 221 is smaller than the outer contour of the protrusion 112. The width of the second slot 222 is larger than that of the first slot 221. Preferably, the width of the second slot 222 is larger than the protrusion 112, so that the protrusion 112 can be easily engaged with the second slot 222. An inclined face 223 is formed between the first slot 221 and the second slot 222. When the protrusion 112 is located in the second slot 222 and moves toward the first slot 221, the rotating shaft 2 expands radially outward and the inclined faces 223 guide the protrusion 112 to be engaged with the first slot 221. In order to enhance the connection between the protrusion 112 and the first slot 221, the first slot 221 is parallel to the axis of the rotating shaft 2. The inclined faces 223 are inclined relative to the axis of the rotating shaft 2 so as to achieve the purposes mentioned above. Accordingly, the two ends of the flat plate 2' may be arranged in different positions or have the end faces 23 to allow the flat plate 2' to be rolled into a tube to form the first slot 221, the second slot 222 and the inclined faces 223.

Figure 2:
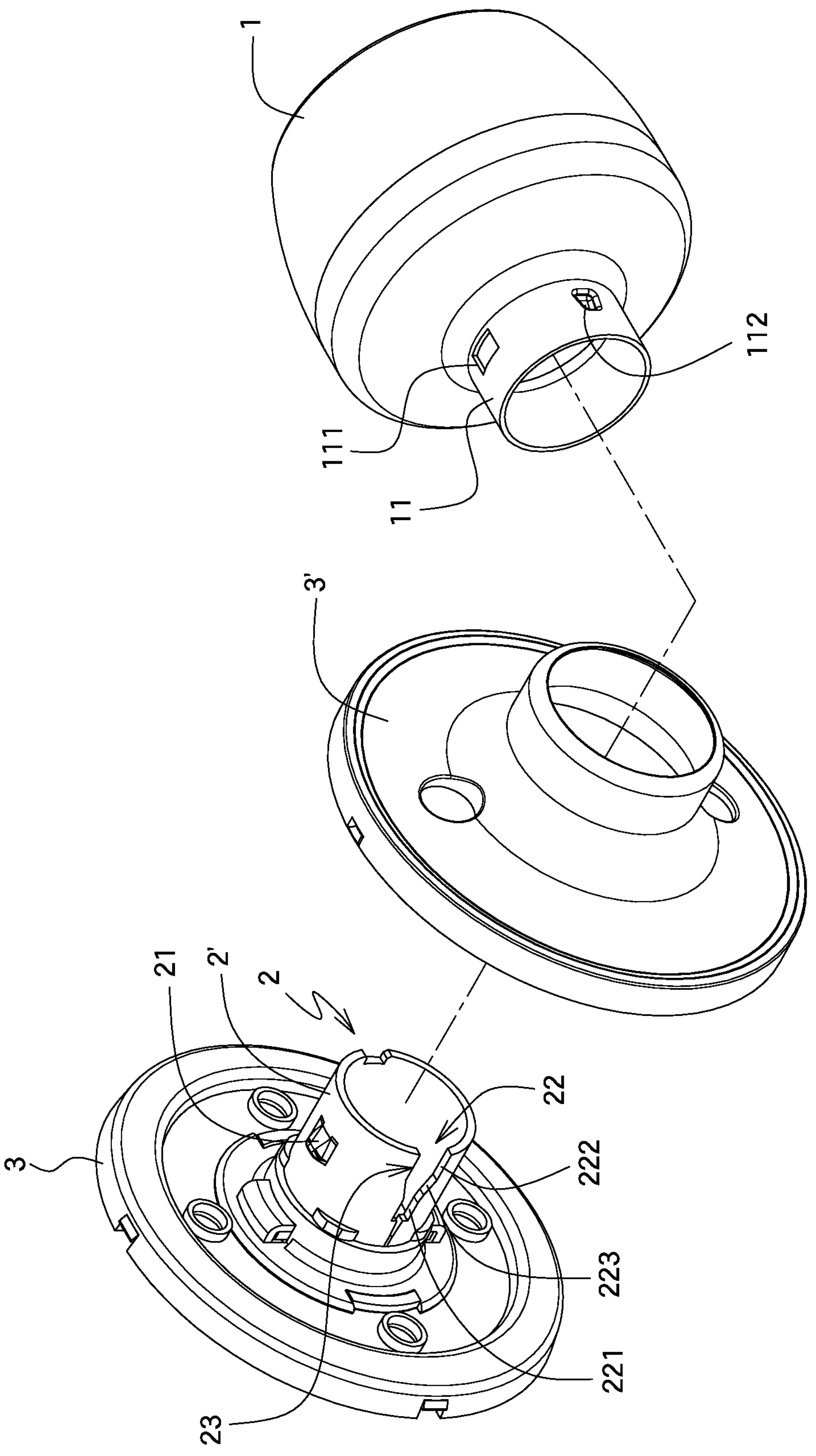
FIG. 2 is an exploded view to show the lock handle and rotating shaft of the present invention.
Figure 3:
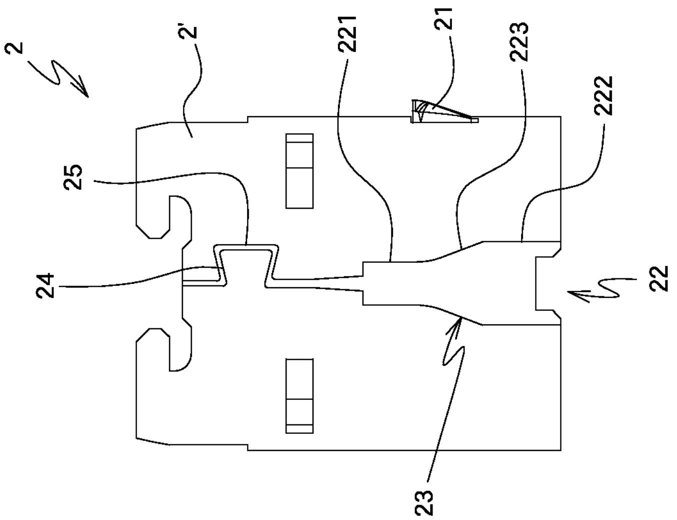
FIG. 3 shows the guiding slot of the flat body that is rolled into a rotating shaft.
Figure 4:
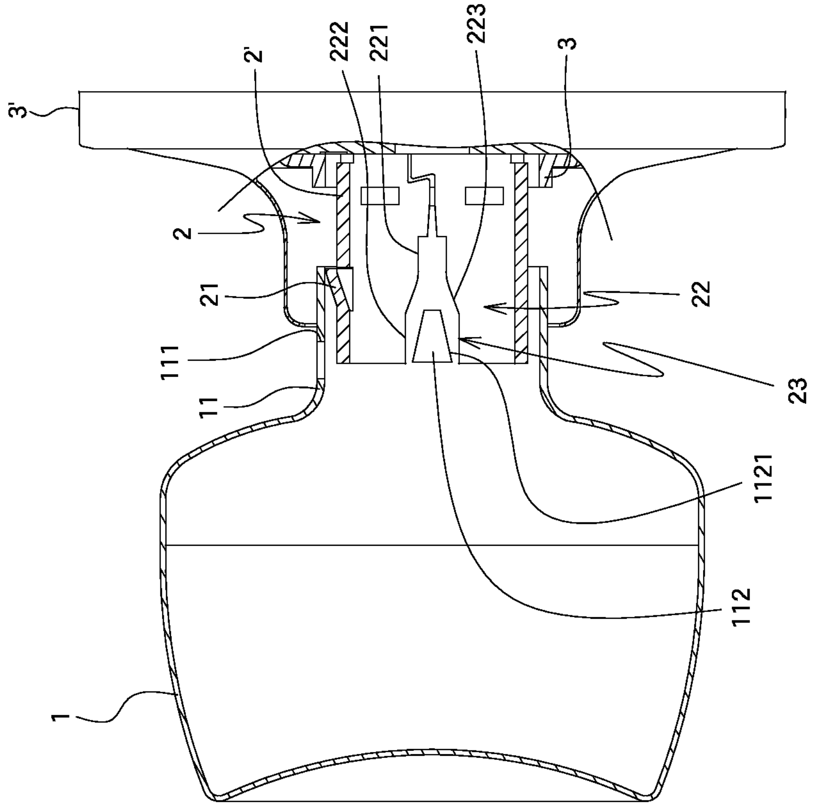
FIG. 4 is a cross sectional view to show that the protrusion of the socket is about to abut the inclined faces of the guiding slot of the rotating shaft.
Figure 5:
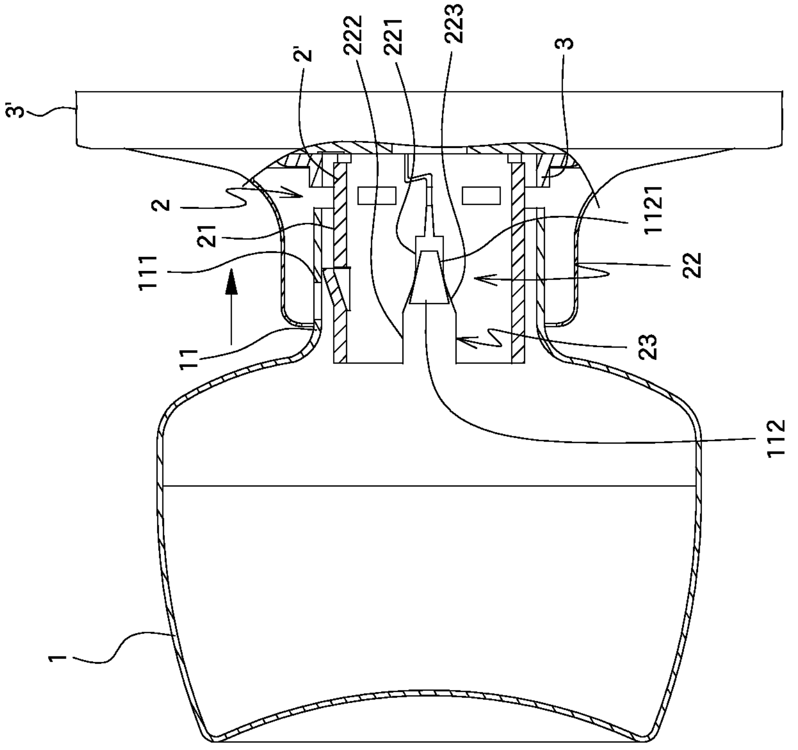
FIG. 5 shows that the protrusion of the socket touches the inclined faces of the guiding slot of the rotating shaft.
Figure 6:
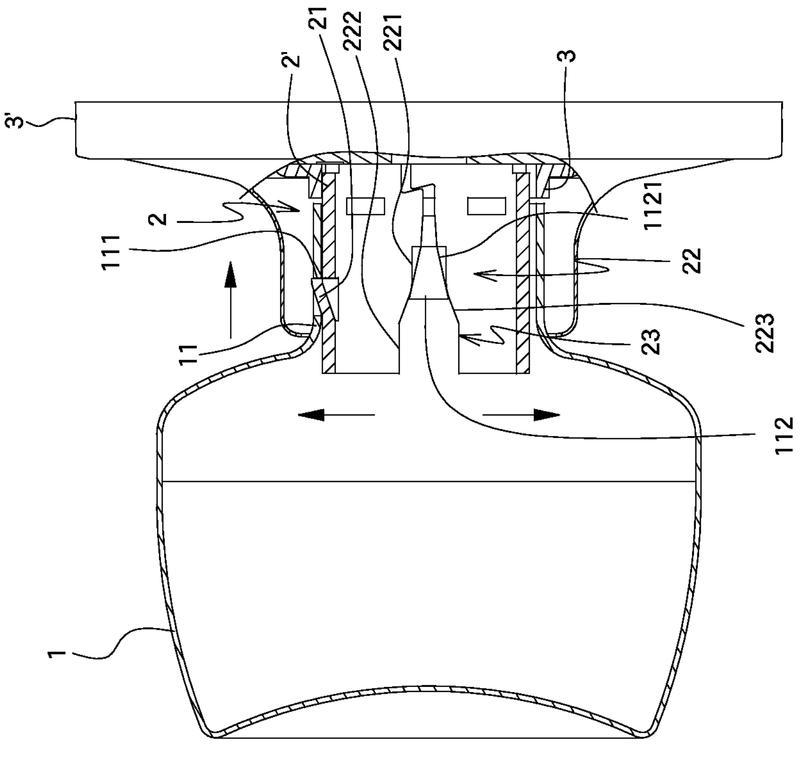
FIG. 6 is a cross sectional view taken along line A-A in FIG. 1 and shows that the protrusion of the socket abuts against the inclined faces of the guiding slot of the rotating shaft, and the rotating shaft expands radially outward and the securing member is engaged with the connection portion.
Figure 7:
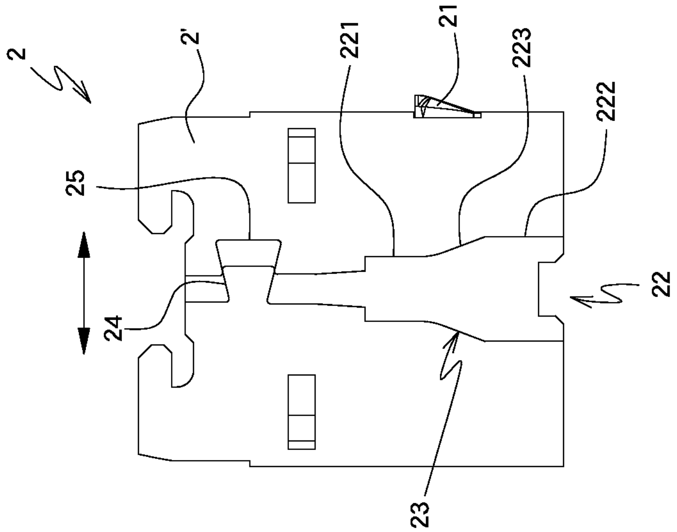
FIG. 7 shows that eh rotating shaft expands radially outward, the position of the fitting member relative to the recess.

As shown in FIGS. 2 to 4, when the handle 1 is to be connected to the rotating shaft 2, the protrusion 112 moves axially toward the second slot 222. The outer diameter of the rotating shaft 2 is smaller than the inner diameter of the socket 11 of the handle 1, so that the rotating shaft 2 is inserted in the socket 11. Alternatively, the width of the second slot 222 is larger than the protrusion 112, so that the protrusion 112 is easily aligned with the second slot 222 to let the protrusion 112 easily insert into the second slot 222. At this moment, the rotating shaft 2 has not yet expands radially outward, so that the securing member 21 is not engaged with the connection portion 111. As shown in FIG. 5, when the handle 1 approaches axially toward the rotating shaft 2, the protrusion 112 contacts the inclined faces 223. The width of the inclined faces 223 is narrowed toward the first slot 221 and is smaller than the width of the protrusion 112. Eventually, the protrusion 112 is guided by the inclined faces 223 along with the movement of the handle 1 toward the rotating shaft 2. The protrusion 112 pushes the inclined faces 223 outward, and the rotating shaft 2 extends radially outward. As shown in FIGS. 6 and 7, along with the expansion of the rotating shaft 2, the securing member 21 is engaged with connection portion 111, so that the socket 11 of the handle 1 is connected to the rotating shaft 2 via the securing member 21 and the connection portion 111. The protrusion 112 is completely or partially positioned in the first slot 221.

Figure 8:
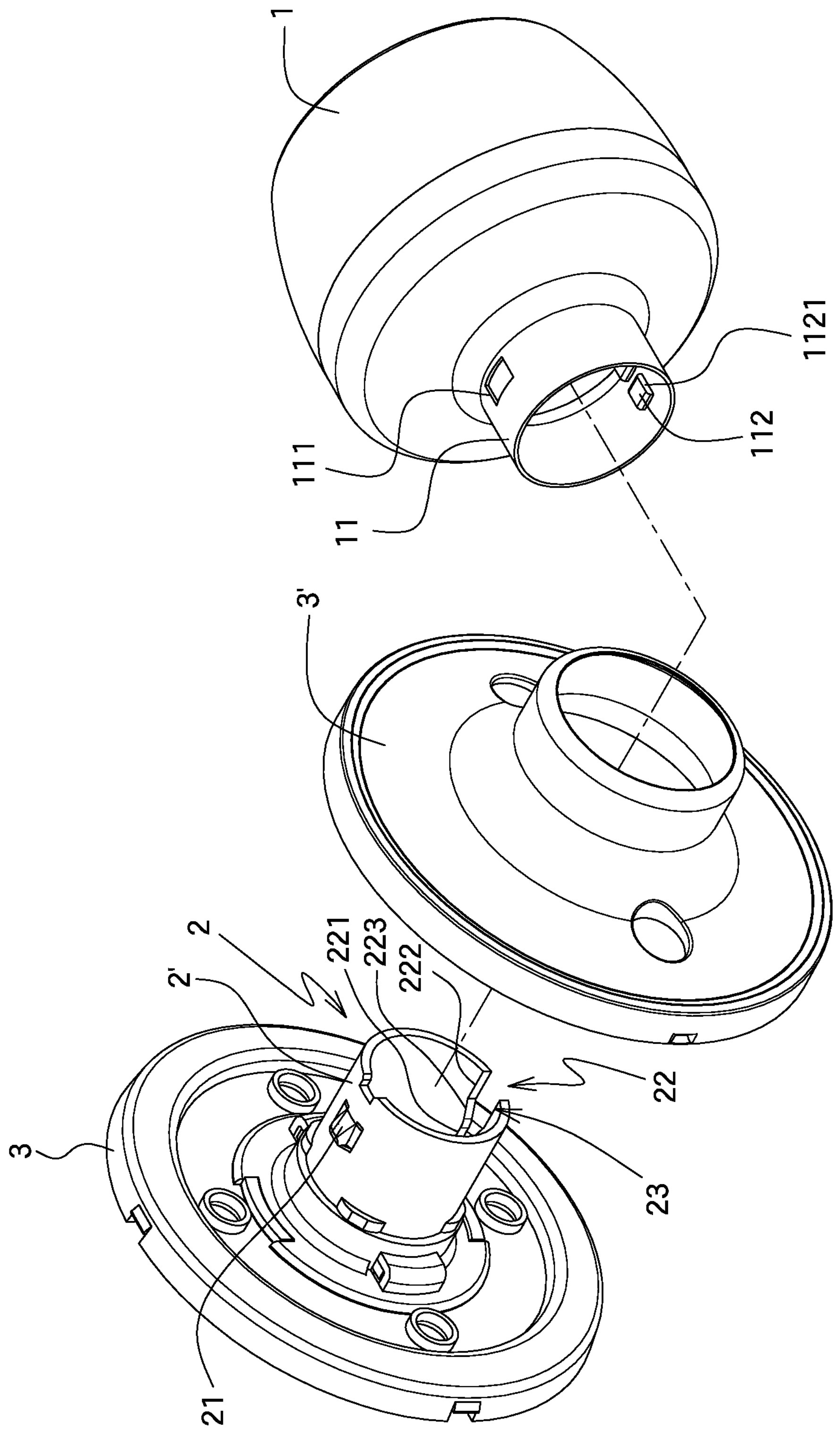
FIG. 8 is an exploded view to show the second embodiment of the lock handle and rotating shaft of the present invention.

In order to reduce the resistance when the protrusion 112 pushes the inclined faces 223 outward when expanding the rotating shaft 2, the protrusion 112 is a trapezoidal protrusion and includes two guiding faces 1121 respectively formed to two sides of the protrusion 112 in the rotation direction of the protrusion 112. The two guiding faces 1121 are located corresponding to the inclined faces 223, when the rotating shaft 2 axially pushes the inclined faces 223, the guiding faces 1121 abut against the inclined faces 223 and the rotating shaft 2 expands radially outward. This makes the protrusion 112 be easily engaged with the first slot 221. As shown in FIG. 8, the protrusion 112 can also be a rectangular protrusion, when the protrusion 112 is eventually engaged with the first slot 221, the contact area between the guiding faces 1121 and the first slot 221 is increased.

As shown in FIGS. 2 to 4, a fitting member 24 protrudes from the one of the two ends of the flat body 2' in the rolling direction of the flat body 2', and a recess 25 is formed to another one of the two ends of the flat body 2' in the rolling direction of the flat body 2'. The depth of the recess 25 is greater than the length of the fitting member 24 so as to provide space when the rotating shaft 2 expands radially outward. Also, the connected between the fitting member 24 and the recess 25 prevent the rotating shaft 2 from overly rotating. As shown in FIGS. 2, 4 and 7, the fitting member 24 protrudes radially from the rotating shaft 2 and is widened in the rotation direction of the flat body 2', and the recess 25 is narrowed in the rotation direction of the flat body 2'. Preferably, the fitting member 24 and the recess 25 are dovetail shape. Therefore, as shown in FIG. 4, when the flat body 2' is rolled and formed into the rotating shaft 2, the fitting member 24 is located in the central portion of the recess 25. In another embodiment, the diameter of the rotating shaft 2 at its initial status is small, and the fitting member 24 contacts the inside of the recess 25. When the rotating shaft 2 expands radially outward by the protrusion 112 contacting against the inclined faces 223, the fitting member 24 moves toward and is engaged with the recess 25 as shown in FIG. 7 to restrict the expansion of the rotating shaft 2. This prevents the rotating shaft 2 from overly rotating to affect its tubular shape and its rotation. In other embodiment, the outer diameter of the expanded rotating shaft 2 is corresponding to the inner diameter of the socket 11 of the handle 1, the expansion of the rotating shaft 2 is also restricted by the socket 11.

When manufacturing the lock, the rotating shaft 2 is assembled with the inner plate 3, after the color and style of the handle and the outer plate 3' are confirmed by the customer, the handle 1 and the outer plate 3' are processed surface treatment. After the surface treatment is done, the rotating shaft 2, the inner plate 3, the handle 1 and the outer plate 3' can be assembled with each other without any tool in a modular manner. The process and time of order processing are significantly improved, and the efficiency of production after orders are received is also increased.

As shown in FIG. 8 which shows the second embodiment of the present invention, and the difference between the first and second embodiments are that the shape of the protrusion 112 is different, and the positions of the guiding slot 22 of the rotating shaft 2 and the securing member 21 are located at the 90 degrees in the circumferential direction of the rotating shaft 2. Therefore, when the protrusion 112 is located in the guiding slot 22, the securing member 21 is engaged with the connection portion 111 when the rotating shaft 2 expands radially outward. In the second embodiment, the positions of the guiding slot 22 and the securing member 21 are located at 180 degrees in the circumferential direction of the rotating shaft 2. Also, the positions of the connection portion 111 and the protrusion 112 of the socket 11 of the handle 1 are located at 180 degrees in the circumferential direction of the rotating shaft 2. The customers choose the first embodiment or the second embodiment to be used with different types of locks. It is also noted that other angles in the circumferential direction of the rotating shaft 2 are also available.

By the guiding slot 22 of the present invention, when the rotating shaft 2 is axially connected to the handle 1, the protrusion 112 is guided by the guiding slot 22 to expand the rotating shaft 2 radially outward. The securing member 21 of the rotating shaft 2 is radially engaged with the connection portion 111 without riveting to reduce the processes of assembling. After the order is confirmed by the customers, the handle 1 and the outer plate 3' are processed surface treatment, and the rotating shaft 2, the inner plate 3, the handle 1 and the outer plate 3' can be assembled with each other without any tool in a modular manner. The process and time of order processing are significantly improved, and the efficiency of production after orders are received is also increased.

While we have shown and described the embodiment in accordance with the present invention, it should be clear to those skilled in the art that further embodiments may be made without departing from the scope of the present invention.

What is claimed is:

1. A lock handle and rotating shaft combination mechanism, comprising: a handle (1) having a socket (11) extending axially therefrom, the socket (11) being a tubular socket and including a connection portion (111) and a protrusion (112), a rotating shaft (2) being a tubular expandable shaft and including a stationary securing member (21) formed radially outward from the rotating shaft (2), the securing member (21) located corresponding to the connection portion (111), a guiding slot (22) defined axially in a distal end of the rotating shaft (2), when the protrusion (112) is engaged with the guiding slot (22) along a separation line, the rotating shaft (2) expands radially outward, and the securing member (21) is engaged with the connection portion (111) to connect the handle (1) to the rotating shaft (2) with the socket (11) sleeved over the rotating shaft (2).

2. The lock handle and rotating shaft combination mechanism as claimed in claim 1, wherein the guiding slot (22) includes a first slot (221) and a second slot (222) communicating with each other, the second slot (222) is located at the distal end of the rotating shaft (2), when the handle (1) is not assembled on the rotating shaft (2), a width of the first slot (221) is smaller than an outer contour of the protrusion (112), a width of the second slot (222) is larger than that of the first slot (221), an inclined face (223) formed between the first slot (221) and the second slot (222).

3. The lock handle and rotating shaft combination mechanism as claimed in claim 2, wherein the protrusion (112) includes two guiding faces (1121) respectively formed to two sides of the protrusion (112) in a rotation direction of the protrusion (112), the two guiding faces (1121) are located corresponding to the inclined faces (223), when guiding faces (1121) abut against the inclined faces (223), the rotating shaft (2) expands radially outward.

4. The lock handle and rotating shaft combination mechanism as claimed in claim 2, wherein the protrusion (112) is a rectangular shape.

5. The lock handle and rotating shaft combination mechanism as claimed in claim 1, wherein the rotating shaft (2) is formed from a flat body (2') into a tubular shape, at least one end face (23) is formed to one of two ends of the flat body (2') in a longitudinal direction of the flat body (2') to form the guiding slot (22), the separation line of the rotating shaft is formed where the two ends of the flat body met.

6. The lock handle and rotating shaft combination mechanism as claimed in claim 5, wherein a fitting member (24) protrudes from a first end of the flat body (2') in the longitudinal direction of the flat body (2'), a recess (25) is formed to another one of the two ends of the flat body (2') in the longitudinal direction of the flat body (2'), a depth of the recess (25) is greater than a length of the fitting member (24).

7. The lock handle and rotating shaft combination mechanism as claimed in claim 6, wherein the fitting member (24) is widened in the longitudinal direction of the flat body (2'), the recess (25) is narrowed in the longitudinal direction of the flat body (2').

8. A combination mechanism of a lock handle and a rotating shaft as claimed in claim 7, wherein the fitting member (24) and the recess (25) are dovetail shape.

* * * * *